Figures 1, 4:
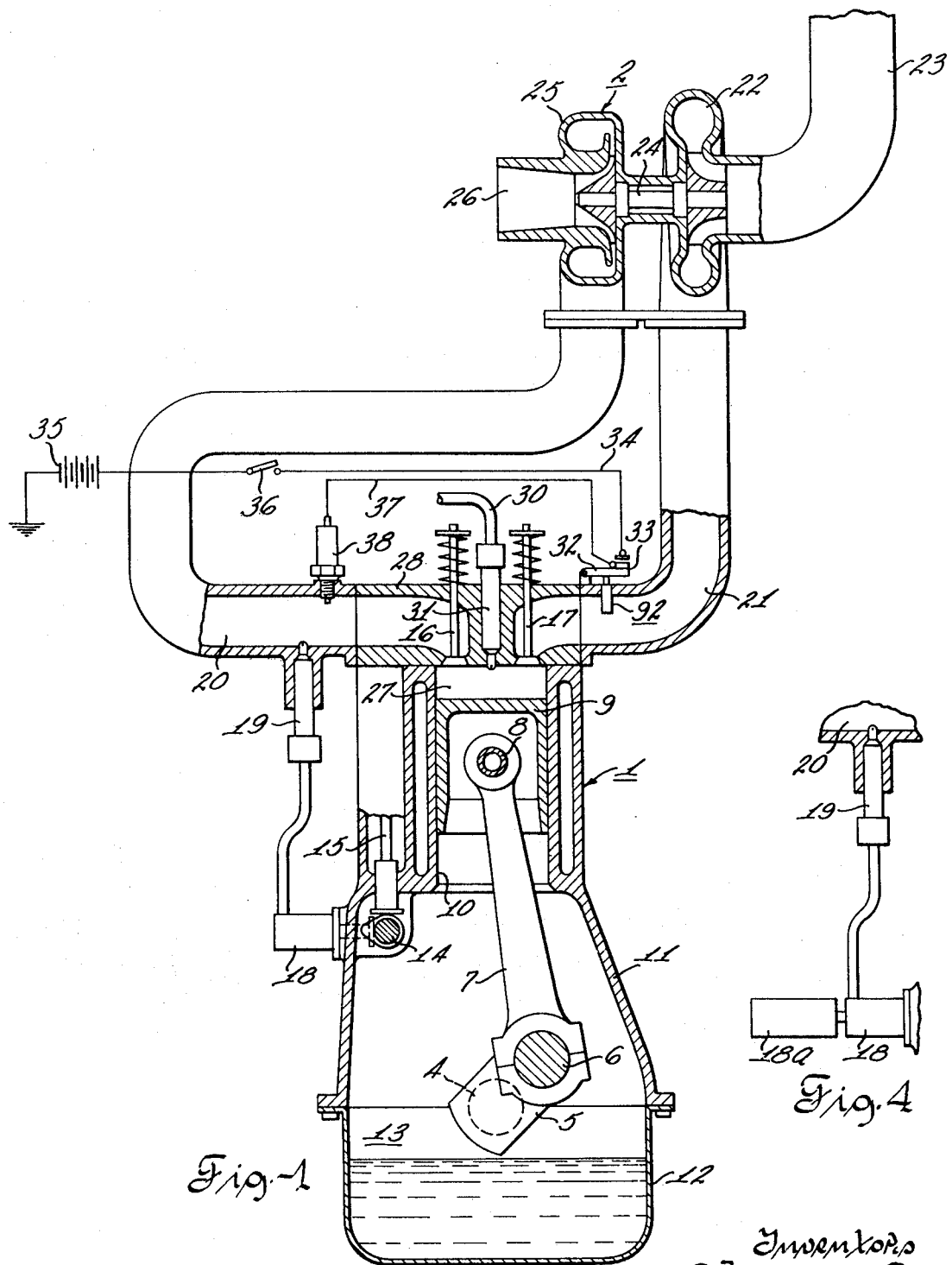

United States Patent [19]
Dreisin et al.

[11] 3,996,912
[45] Dec. 14, 1976

[54] LOW COMPRESSION RATIO DIESEL ENGINE

[75] Inventors: Alexander Dreisin, Olympia Fields; Floyd G. West, Park Forest, both of Ill.

[73] Assignee: Allis-Chalmers Corporation, Milwaukee, Wis.

[22] Filed: Sept. 11, 1975

[21] Appl. No.: 612,334

Related U.S. Application Data

[63] Continuation of Ser. No. 141,021, May 6, 1971, abandoned, which is a continuation of Ser. No. 692,746, Dec. 22, 1967, abandoned.

[52] U.S. Cl. .................. 123/179 H; 123/122 G; 123/179 L
[51] Int. Cl.² ......................................... F02N 17/00
[58] Field of Search ....... 123/179 H, 179 G, 179 L, 123/122 G, 127; 60/601, 602, 603

[56] References Cited

UNITED STATES PATENTS

| | | | |
|---|---|---|---|
| 2,608,051 | 8/1952 | Nettel | 60/601 |
| 2,633,698 | 4/1953 | Nettel | 60/602 |
| 2,654,991 | 10/1953 | Wettel | 60/602 |
| 3,353,520 | 11/1967 | Haag | 123/179 H |
| 3,379,184 | 4/1968 | Wolf | 123/179 H |
| 3,397,684 | 8/1968 | Scherenberg | 123/179 H |
| 3,526,214 | 9/1970 | Kamo | 123/179 H |

*Primary Examiner*—Wendell E. Burns
*Assistant Examiner*—David D. Reynolds
*Attorney, Agent, or Firm*—Arthur L. Nelson

[57] ABSTRACT

A diesel engine operating with a low compression ratio.

21 Claims, 4 Drawing Figures

LOW COMPRESSION RATIO DIESEL ENGINE

This is a continuation of application Ser. No. 141,021 now abandoned, filed May 6, 1971, which is a continuation of application Ser. No. 692,746, now abandoned filed Dec. 22, 1967.

This invention relates to a compression-ignition (diesel) engine and more particularly to a diesel engine operating wth a low compression ratio.

The development of the diesel engine encompasses a continuing effort to increase the horsepower output per unit weight. In the development of the compression ignition engine, higher and higher levels of turbocharging or supercharging have presented a number of problems. These problems are connected with the fact that mechanical and thermal stresses increase in proportion to the amount of energy extracted from the engine per unit of engine displacement. As more air is compressed into the cylinder and more fuel in injected to burn this air, the peak cylinder pressures increase on a fixed compression ratio engine. In addition, the rate of cylinder pressure increase during combustion goes up. These factors increase mechanical stresses on the engine parts as cranks, bearings, pistons and piston rings, valves, cylinder heads, etc.

In addition, as the cylinder pressures go up, the coefficient of heat transfer through the combustion chamber walls also keeps rising, increasing heat transfer rates. This in turn increases the thermal stresses on pistons, liners, and cylinder heads.

In order to increase specific engine output without unduly increasing engine weight and without exceeding allowable stress levels, it has been proposed, for example, to use a variable compression ratio piston. A variable compression ration piston has provisions to adjust the compression ratio in the cylinder depending on the engine load. As the fuel quantity injected into the cylinder increases, leading to higher peak cylinder pressures, the variable compression ratio piston changes its position relative to the combustion chamber resulting in a lower compression ratio and, consequently, lower peak cylinder pressures. At low levels of engine output, when peak cylinder pressures are low, such a piston increases the compression ratio sufficiently to maintain the required level of air charge temperatures near the end of the compression stroke to insure satisfactory ignition of fuel.

The variable compression ratio pistons have the disadvantages of high mechanical complexity and additional piston weight which, in turn, results in increased inertia forces and concomitant engine dynamic balancing problems.

This invention proposes to build an engine with a low compression ratio so as to lower the values of peak cylinder pressure at high levels of output.

Current practice has shown that the compression ratio of a diesel engine has to be about 14:1 or higher to assure satisfactory starting in cold weather. In addition, lower compression ratios do not heat the air change sufficiently to assure satisfactory combustion under light loads or in cold ambient environments.

It is proposed to use a low compression ratio diesel engine with an auxiliary heating system which would preheat the air in the engine intake manifold sufficiently to assure satisfactory ignition of fuel in the engine cylinders upon compression of the preheated air charge.

The temperature in the cylinder at any time during the compression stroke, previous to fuel being injected into the cylinder is a function of the thermodynamic relationship $$T_2 = T_1 \left(\frac{V_1}{V_2}\right)^{n-1}$$

where
- $T_1$ = the absolute temperature in the cylinder at the start of the compression stroke;
- $T_2$ = the absolute temperature in the cylinder with the cylinder volume of $V_2$;
- $V_1$ = cylinder volume with the piston at bottom dead center
- $V_1$ = cylinder volume with the piston in its position where cylinder temperature is desired to be known
- $n$ = an exponential constant for polytropic compression.

The value of $n$ varies according to the cylinder wall temperatures. The cylinder wall temperatures vary with engine oil temperature, engine water temperature and the load on the engine.

The following auxiliary fuel system is proposed. An auxiliary fuel pump is provided which is capable of delivering a small quantity of fuel at all engine speeds and loads. This auxiliary fuel quantity is preferably less than the quantity required to run the engine without load (idling conditions). Such a pump could be driven off the engine camshaft or any suitable rotating engine part or by an independent power source. This pump can be either of a continuous delivery type or of a type generating discrete pressure pulses. The auxiliary pump outlet is connected with an atomizing type of spray nozzle or a multiplicity of such nozzles. In the immediate vicinity of this nozzle or nozzles, there is arranged an ignition means which can be of the spark plug type or the glow type. This ignition means is connected to a source of electrical energy either directly or through a transformer and high frequency current interrupter to generate a rapid succession of sparks. A switch is provided in series with this electrical circuit which is connected to a transducer for measuring engine operating parameters. It can be made responsive to either engine temperatures and or engine pressures or engine load and is arranged in such a way that the electric circuit remains closed at starting and at light loads but is switched off whenever engine temperature or load level goes up sufficiently to provide satisfactory combustion.

When the engine is started, the auxiliary pump delivers atomized fuel to the intake and this fuel is ignited by the ignition means. This flame in the intake system raises the temperature of the incoming air and consequently increases the compression temperature of the air charge to a level satisfactory to obtain compression-ignition of the normally injected main fuel quantities. As the engine starts and runs at light load, the auxiliary system continues to furnish a flame in the intake system to maintain proper engine operating temperatures.

In subsequent engine operation, the air charge temperature near the end of the compression stroke may increase due to rising ambient temperature or due to higher engine output. In the latter case, the temperature of the cylinder walls, piston, and cylinder head may rise sufficiently to reduce the transfer of heat from the air charge to the engine cooling medium during the compression stroke so that the air charge temperature rises to that level sufficient for satisfactory ignition of fuel. Also, on turbocharged and supercharged engines, intake air at higher engine loads is compressed to higher pressures which increase the air temperature. A transducer or combination of transducers is used to sense this condition and to signal this to the auxiliary heating system. This signal may be used in the following two ways:

1. It can switch off both the auxiliary fuel pump and the ignition means after which the engine continues to operate like a conventional diesel engine; or
2. The signal can simply switch off the ignition means while the auxiliary pump is kept operating.

In the latter case, the fuel injected into the intake manifold by the auxiliary pump is mixed with the intake air in a finely atomized state but is not burned. This intake system then acts to provide "fumigation" which, as is known, helps to reduce the rate of cylinder pressure rise at the higher levels of mean effective pressures.

It is an object of this invention to operate a compression-ignition engine with a low compression ratio.

It is another object of this invention to provide a compression-ignition engine having a low compression ratio with means to increase intake air temperature for cold starting and low load running with the possibility of providing "fumigation" at higher levels of mean effective pressure.

It is a further object of this invention to operate a low compression ratio diesel engine with high mean effective pressure by controlling the intake air temperature and to provide the option of "fumigation" under higher levels of mean effective pressure.

The objects of this invention are accomplished by providing a low compression ratio diesel engine with a sensing means which senses one or more parameters of the operating engine such as temperature or pressure or load. The temperature or pressure or load sensors may be positioned at one of a number of different locations on the engine. At start, idle, or light load conditions the temperature of the intake manifold incoming air is raised to provide sufficient ignition temperature of the air charge near the end of the compression stroke. This is accomplished by providing the combustion of some fuel in the intake manifold for heating incoming air.

The preferred embodiments of the invention will be described in the following paragraphs and are illustrated in the attached drawings.

FIG. 1 is a schematic view of a compression-ignition engine illustrating a temperature sensing means in the exhaust manifold which controls the operation of an intake manifold air heating system. Whenever the exhaust temperature falls below a predetermined limit, the heater is turned on.

Figure 2:
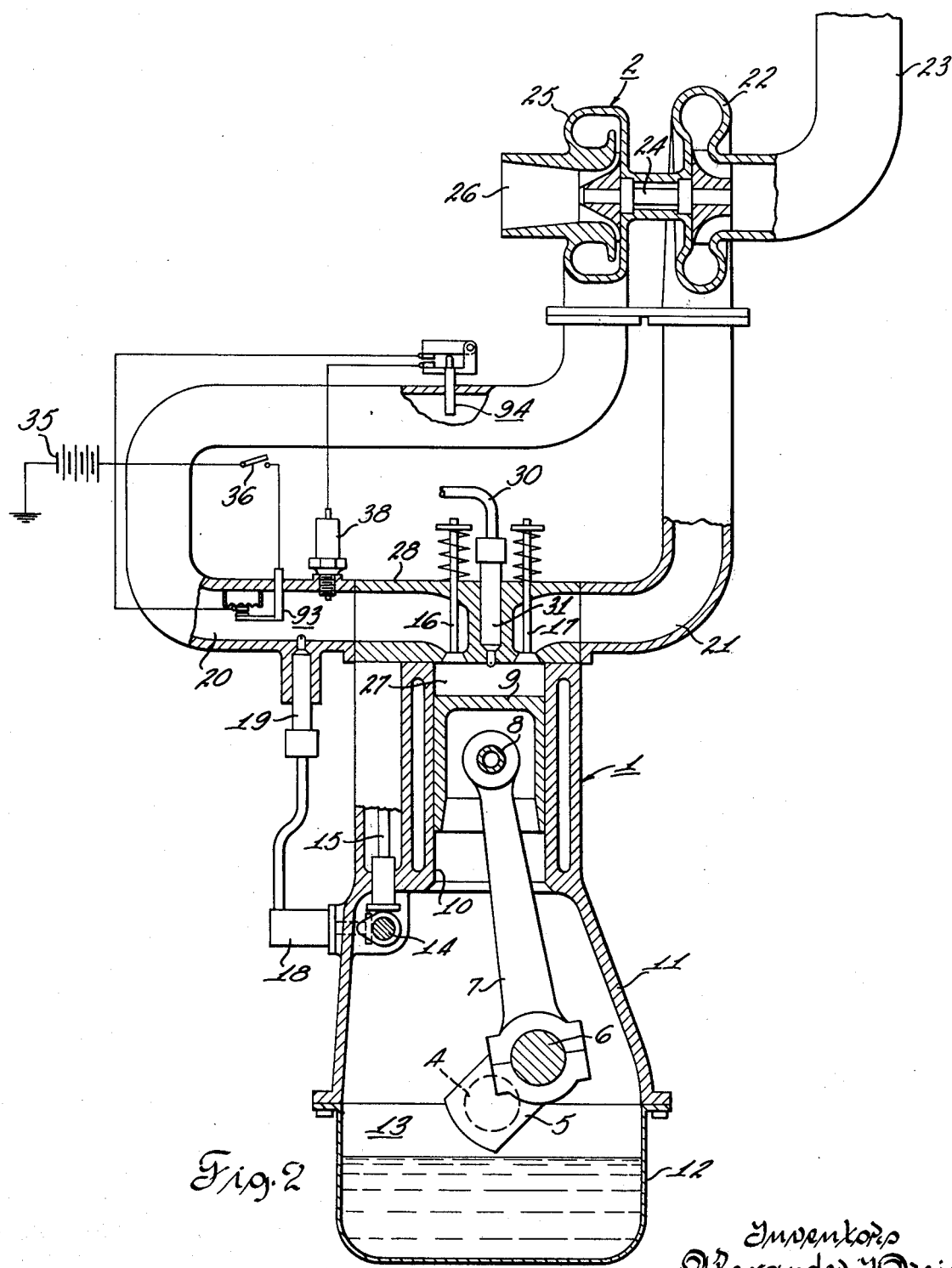

FIG. 2 is a schematic view of a compression-ignition engine illustrating a temperature sensing means which senses the compressor discharge temperature and a pressure sensing means which senses the intake manifold pressure, these two sensing elements are connected in series electrically and control the operation of the intake manifold air heating system. The element which senses the compressor discharge temperature is preset for a predetermined temperature and its electrical contacts are open when the compressor discharge temperature is above the set point. The pressure sensing element is also preset and its electrical contacts open when the intake manifold pressure is above the set point. Thus the intake manifold air heater is in operation whenever the compressor discharge temperature is below the set point of the temperature sensing means, except when the intake manifold pressure is above the set point of the pressure sensing means.

Figure 3:
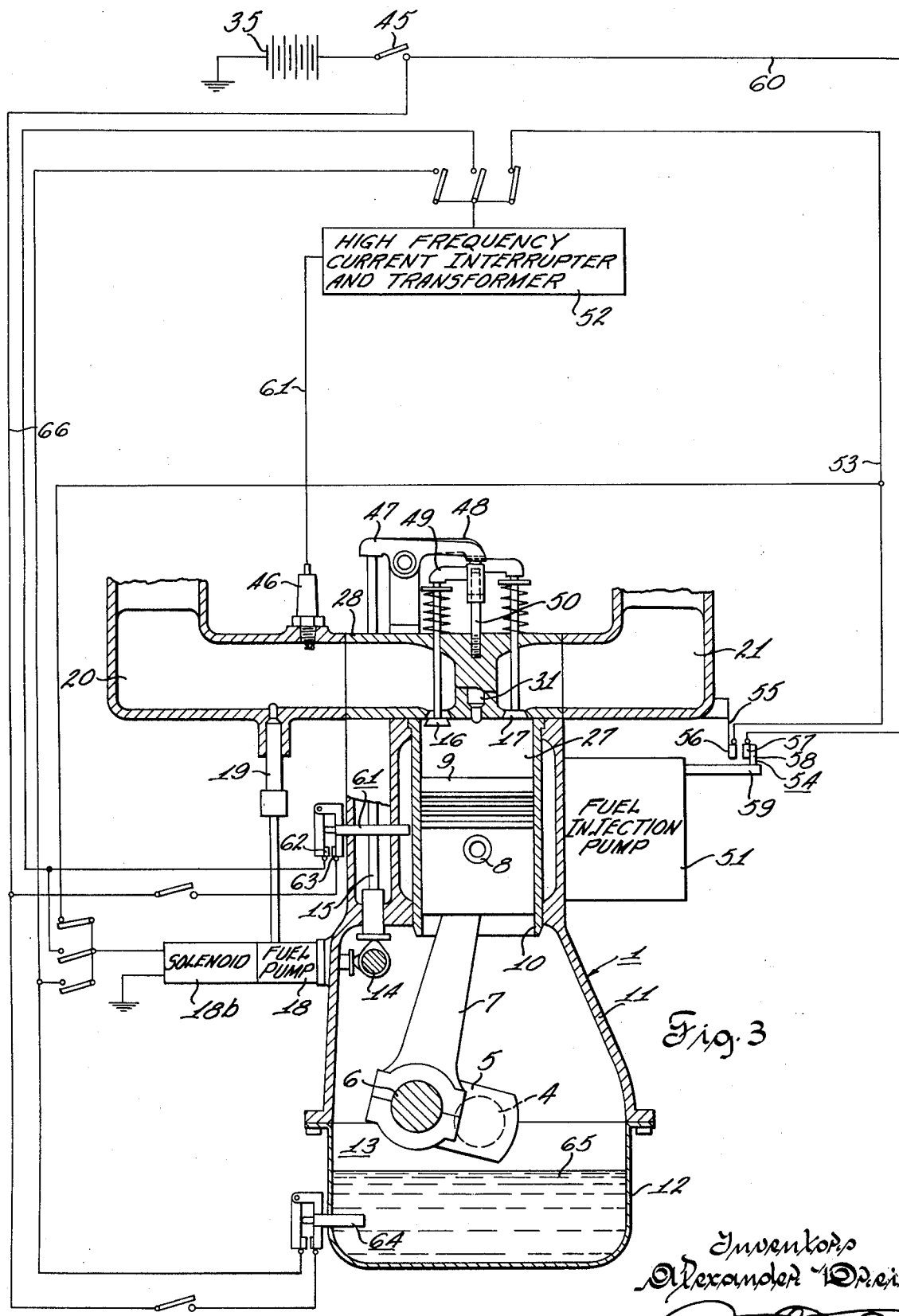

FIG. 3 shows a second alternate system for controlling the manifold air heater plus a spark ignition system for ignition of the fuel and air mixture in the intake manifold. The auxiliary fuel pump and the ignition are controlled by a water jacket temperature sensing means or an oil temperature sensing means until the temperature being sensed is above the set point of the temperature sensing means, then the manifold air heater is controlled by a limit switch which is attached to the fuel injection pump control shaft. Thus when the fuel pump injection quantity is increased above a preset quantity, the manifold air heating system is turned off. Since the fuel pump injection quantities are very closely related to the load on the engine, the fuel injection pump control shaft limit switch can be set to turn off the manifold air heater at a desired load whenever the temperature sensing means is sensing temperatures above its set point.

FIG. 4 is an alternate means of driving the auxiliary fuel pump through the use of a motor.

Referring to FIG. 1, the cross section of the engine 1 is schematically illustrated with an exhaust driven turbocharger 2. The engine 1 includes a crankshaft 4 having a crank arm 5 having a crankpin 6 connected to the connecting rod 7. The wrist pin 8 connects the connecting rod 7 to the piston 9 which operates within the cylinder 10. The connecting rod 7 and crankshaft 4 operate within the crankcase 11 which is connected to the oil pan 12, having an oil reservoir 13. The engine includes a camshaft 14 operating the push rods 15 which drive through a suitable connecting means to operate the intake valve 16 and the exhaust valve 17. The cam shaft 14 also drives an auxiliary fuel pump 18 which is hydraulically connected to the spray nozzle 19 which sprays atomized fuel into the intake manifold 20.

The engine includes an exhaust manifold 21 for receiving gasses from the engine which pass through the turbine 22 through the exhaust pipe 23 to the atmosphere. The turbine 22 is connected by a shaft 24 to the compressor 25. The compressor 25 receives air through the intake pipe 26 and compresses the air in the intake manifold 20 which passes into the combustion chamber 27 bounded by the engine head 28, the piston 9 and the cylinder wall 10.

The compression-ignition engine operates by compressing the air or air fuel mixture in the combustion chamber 27 to ignite the fuel. The exhaust gasses which are exhausted through the exhaust manifold 21 drive the turbine 22 which in turn drives the compressor 25 to compress air in the intake manifold 20. The compressed air in the intake manifold 20 charges the combustion chamber 27 to permit greater power output of the engine. Fuel is supplied by an injection pump through the fuel line 30 to the main injector 31. The main injector 31 is timed to inject fuel into the combustion chamber 27 for ignition and combustion in the engine.

The auxiliary fuel system consists of a fuel pump 18 operated, in this case, by the camshaft 14, but, in general, by any rotating member of the engine or by any independent source. The pump 18 is connected with the spray nozzle 19 near which is located on ignition means such as a spark plug or, as illustrated, a glow plug 38.

This auxiliary fuel system would be best controlled by a signal or signals sensing the air charge temperature in the engine combustion chamber 27 near the end of the compression stroke. However, the present state of the art does not furnish any convenient and reliable instrument to measure this parameter directly. Therefore a secondary engine performance parameter or combination of parameters which correlates with the air charge temperature in the combustion chamber 27 near the end of the compression stroke must be used.

FIG. 1 illustrates the measurement of only one of the many engine operating characteristics which correlates with the air charge temperature in the combustion chamber 27 near the end of the compression stroke. Sensing means 92 senses the temperature in the exhaust manifold 21. As the load on the engine increases, the exhaust manifold temperature rises and at the same time the compression temperatures rise because of the increased residual heat in the cylinder walls because of the increased fuel quantity burned in the combustion chamber during the previous cycles. The temperature sensing means 92 has a movable arm 32 with an attached electrical contact for engaging the contact 33 connected to the conductor 34 which is connected to the switch 36. A source of electrical energy 35 is shown grounded on the one side and connected to the switch 36 on its other side. The contact on the bimetalic arm 32 is connected to the glow plug 38 through the conductor 37. When the engine is being started and operated, switch 36 is closed. Whenever the exhaust temperature is below the set point on switch 92, electrical energy is supplied to the glow plug 38. The glow plug becomes hot and ignites the fuel injected in the intake manifold 20 by the spray nozzle 19.

FIG. 4 illustrates that case where the auxiliary fuel pump 18 is driven by a motor 18a, independent of the engine. The circuit controlling the motor 18a can be independent of the sensing means circuit and, therefore, can be made to operate after the ignition means 38 is stopped by shutting off the sensing means circuit, thus causing "fumigation". Alternately, the circuit of the motor 18a can be in series with the sensing means circuit. This will cause fuel pump 18 to stop pumping when the ignition means is turned off by the sensing means and will allow the engine to operate in a conventional manner without "fumigation."

FIG. 2 is identical to FIG. 1 with the exception that the ignition means, glow plug 38, is controlled by a pressure sensing means 93 in the intake manifold and a temperature sensing means 94 which senses the discharge temperature of the compressor 25. The pressure sensing means 93 is shown connected in series with the temperature sensing means 94, consequently electrical energy from the electrical source 35 is supplied to the glow plug 38 whenever the engine 1 is being cranked or operated unless the discharge temperature of the compressor 25 is above the set point of the temperature sensing means 94 and the intake manifold pressure is above the set point of the pressure sensing means 93. The circuitry may be modified to connect the sensors 93 and 94 in parallel thereby energizing the glow plug 38 in response to one or the other sensor.

FIG. 3 illustrates a second alternate method for controlling the intake manifold air heating system plus it shows a spark ignition system for igniting the fuel and air mixture in the intake manifold 20.

In this case, the manifold air heating system is controlled by the spring loaded limit switch 54 and either a water jacket temperature sensing transducer 61 or an engine lubricating oil temperature sensing transducer 64 sensing the temperature of the lubricating oil 65 in the oil reservoir 13. Transducer 64 is an alternate temperature sensing means which can be connected into the air heating system in place of the water jacket temperature sensing transducer 61 if so desired.

The spring loaded limit switch 54 which consists of an electrical contact 57 attached to the contact arm 58 fastened to the fuel injection pump control shaft 59, a spring loaded arm 55 having an electrical contact 56 connected to the fuel pump solenoid 18b through conductor 53, and to the high frequency current interrupter and transformer 52 as well as the electrical contact 62 of temperature sensing transducer 61. Oil temperature sensing transducer 64 is in parallel with transducer 61. The fuel injection pump control shaft 59 is more commonly referred to as a control rack or a control rod, the movement of it controls fuel quantities rather than the combination of engine speed and load.

As described above, limit switch 54 and water jacket temperature transducer 61 are connected in parallel so that the manifold air heating system will be in operation whenever the temperature being sensed by transducer 61 is below the set point of the transducer and will also be in operation whenever the control shaft 59 setting is at any position which would give a fuel injection quantity less than the quantity where the contacts 56 and 57 of limit switch 54 open. The point of contact opening is referred to as the set point. The spring loaded arm 55 allows the fuel pump control shaft 59 to go to the stop or any other position where the fuel injection pump 51 delivery is less than the delivery at the limit switch 54 set point.

The electrical energy for operating the high frequency transformer 52 and auxiliary fuel pump solenoid 18b is supplied by the power source 35, a battery or other source of power, which is connected electrically to switch 45. Contact 57 of limit switch 54 is connected to switch 45 by conductor 60. Contact 63 is connected electrically by conductor 66 to switch 45. Whenever the engine 1 is being cranked or operated, switch 45 is closed.

When power is supplied to the fuel pump solenoid 18b, fuel pump 18 delivers fuel to the spray nozzle 19. Since the high frequency current interrupter and transformer 52 is connected in parallel with the fuel pump solenoid 18b, and the output of the high frequency interrupter and transformer 52 is connected to the spark plug 46 by conductor 61, the fuel which is sprayed into the intake manifold is ignited by the intermittent sparks which are produced at the air gap of the spark plug 46. The combustion that takes place in the intake manifold 20 heats the intake air before it enters the cylinder 27. When the contacts of both switches 54 and 61 are open, no heating of the intake air is done and the engine operates as a conventional diesel engine.

For the systems shown in FIGS. 1, 2 and 3, the settings on the manifold air heating control switches are a function of ambient air temperature, engine jacket water temperature, engine lubricating oil temperature and compression ratio; therefore, it is necessary to determine the required settings of these switches by laboratory testing using the desired compression ratio and the lowest ambient conditions under which the engine will be operated.

The embodiments of the invention in which an exclusive property or privilege is claimed are defined as follows:

1. A diesel engine having a compression ratio of less than 14 to 1 including, an automatic compression temperature control system operating to insure that the temperature of the air charge in the combustion chamber near the end of the compression stroke is of sufficient magnitude to achieve complete combustion comprising, an intake manifold supplying air atomized fuel and combustion gases to the combustion chamber, an auxiliary fuel injector on said intake manifold injecting atomized fuel into the intake manifold, auxiliary fuel injector drive means continuously operating said injector during engine operation, a transducer sensing means sensing an engine temperature which normally indicates a low engine compression end temperature, means supporting said transducer sensing means on said engine for sensing the sensed engine temperature, an ignition system connected to said transducer sensing means including ignition means igniting the atomized fuel in the intake manifold in response to the presence of the sensed engine temperature normally indicating a low engine compression end temperature to provide precombustion of the atomized fuel for raising intake air temperature and compression end temperatures only during starting low load and speed conditions, a supercharger supplying air to the intake manifold, supercharger drive means on said engine driving said supercharger from engine generated energy for effectively precompressing intake air and raising its temperature and the engine compression end temperature for complete combustion during medium and high load and speed conditions of the engine.

2. A diesel engine as set forth in claim 1 wherein said automatic compression temperature control system includes means supporting said transducer sensing means for sensing the supercharger discharge air temperature and a transducer sensing means sensing intake manifold pressure.

3. A diesel engine as set forth in claim 1 wherein said automatic compression temperature control system includes a main fuel injection pump control shaft limit switch and means supporting said transducer sensing means for sensing water jacket temperature.

4. A diesel engine as set forth in claim 1 wherein said automatic compression temperature control system includes a main fuel injection pump control shaft limit switch and means supporting said transducer sensing means for sensing the engine lubricating oil temperature.

5. A diesel engine as set forth in claim 1 wherein said supercharger includes an exhaust driven compressor unit.

6. A diesel engine as set forth in claim 1 wherein said auxiliary fuel injector drive means includes cam drive means continuously driving said injector.

7. A diesel engine as set forth in claim 1 wherein said ignition system includes a glow plug for igniting the atomized fuel.

8. A diesel engine as set forth in claim 1 wherein said ignition system includes a current interrupter and spark plug.

9. A diesel engine as set forth in claim 1 wherein said auxiliary fuel injector drive means includes a motor operated independently of said engine.

10. A diesel engine as set forth in claim 1 wherein said auxiliary fuel injector includes an engine operated pump for continuous operation during engine operation.

11. A diesel engine as set forth in claim 1 including means connecting said transducer sensing means to a cylinder to thereby sense coolant temperature and control the ignition in response to the sensed temperature.

12. A diesel engine as set forth in claim 1 wherein said transducer sensing means includes, means connecting said transducer sensing means to said intake manifold between said fuel injector and the combustion chamber, said transducer sensing means thereby sensing the temperature of the air in the intake manifold to control the ignition system.

13. A diesel engine as set forth in claim 1 including means connecting said transducer sensing means to an exhaust manifold for sensing temperature of the exhaust gas and controlling the ignition system in response to the exhaust gas temperature.

14. A diesel engine as set forth in claim 1 including means connecting said transducer sensing means to the oil reservoir to sense oil temperature in the oil reservoir.

15. A diesel engine as set forth in claim 1 wherein said automatic compression temperature control system includes means connecting said transducer sensing means to a main fuel injection pump for sensing the engine speed and load condition.

16. A diesel engine as set forth in claim 1 including a main fuel injection pump control shaft, a limit switch on said main fuel injection pump control shaft in said automatic compression temperature control system for controlling precombustion in the intake manifold.

17. A diesel engine having a compression ratio of less than 14 to 1 including, an automatic compression temperature control system operating to insure that the temperature of the air charge in the combustion chamber near the end of the compression stroke is of sufficient magnitude to achieve complete combustion comprising, an intake manifold supplying air atomized fuel and combustion gases to the combustion chamber, an auxiliary fuel injector on said intake manifold injecting atomized fuel into the intake manifold, auxiliary fuel injector drive means driving said auxiliary fuel injector, a transducer sensing means sensing an engine temperature which normally indicates a low engine compression end temperature, an ignition system connected to said transducer sensing means including ignition means igniting the atomized fuel in the intake manifold in response to the presence of the sensed engine temperature normally indicating a low engine compression end temperature to provide precombustion of the atomized fuel for raising intake air temperature and compression end temperatures only during starting low load and speed conditions, a supercharger supplying air to the intake manifold, supercharger drive means on said engine driving said supercharger from engine generated energy for effectively precompressing intake air and raising its temperature and the engine compression end temperature for complete combustion during medium and high load and speed conditions of the engine.

18. A diesel engine as set forth in claim 17 wherein said auxiliary fuel injector drive means includes controlled cam drive means, means connecting said transducer sensing means to said controlled cam drive means for controlling fuel injection in said intake manifold responsive to sensing the engine temperature which normally indicates a low engine compression end temperature by said transducer sensing means.

19. A diesel engine as set forth in claim 18 including means connecting said auxiliary fuel injector drive means with said transducer sensing means for selectively controlling fuel injection independently of and responsive to sensing the engine temperature which normally indicates a low engine compressin end temperature by said transducer sensing means.

20. A diesel engine as set forth in claim 18 wherein said auxiliary fuel injector drive means includes a motor for operating said drive means independently of said transducer sensing means.

21. A diesel engine as set forth in claim 18 including means connecting said auxiliary fuel injection drive means to said transducer sensing means for controlling fuel injection in the intake manifold responsive to sensing by said transducer sensing means.

* * * * *

UNITED STATES PATENT OFFICE
CERTIFICATE OF CORRECTION

Patent No. 3,996,912                 Dated December 14, 1976

Inventor(s) Alexander Dreisin

It is certified that error appears in the above-identified patent and that said Letters Patent are hereby corrected as shown below:

Cover Sheet, Inventor Heading - "Dreisin et al" should be ---Dreisin---.

Cover Sheet, [75] Inventors - "Floyd G. West, Park Forest, both of" should be deleted.

Column 9, line 4, "18" should be ---17---.

Column 9, line 9, "compressin" should be ---compression---.

Column 10, line 1, "18" should be ---17---.

Column 10, line 5, "18" should be ---17---.

Signed and Sealed this

Twenty-second *Day of* November 1977

[SEAL]

Attest:

RUTH C. MASON
*Attesting Officer*

LUTRELLE F. PARKER
*Acting Commissioner of Patents and Trademarks*